United States Patent
Zaleski

[11] 3,738,869
[45] June 12, 1973

[54] ELECTRIC CELL WITH DEPOLARIZER COMPENSATED AGAINST CURRENT EROSION EFFECTS

[75] Inventor: John F. Zaleski, Pleasantville, N.Y.

[73] Assignee: P. R. Mallory & Co. Inc., Indianapolis, Ind.

[22] Filed: May 25, 1972

[21] Appl. No.: 256,833

[52] U.S. Cl. .................................. 136/14, 136/107
[51] Int. Cl. ........................................... H01m 21/00
[58] Field of Search .................... 136/14, 13, 107, 136/83 R, 100 R, 87, 108-110, 134, 135, 175

[56] References Cited
UNITED STATES PATENTS

| | | | |
|---|---|---|---|
| 3,066,179 | 11/1962 | Ruben | 136/83 R |
| 3,116,172 | 12/1963 | Wilke et al. | 136/107 |
| 3,332,802 | 7/1967 | Clune et al. | 136/83 R |
| 3,663,301 | 5/1972 | Ralston et al. | 136/107 |

Primary Examiner—Anthony Skapars
Attorney—Robert Levine

[57] ABSTRACT

An electric cell having a depolarizer structure of stacked pellets, with intermediate metal elements serving to electrically connect the respective pellets to an associated electroconductive support, with the stacked pellets under compression, whereby the pellets are maintained electrically active irrespective of erosive structural deformation and loss of direct electrical contact with the supporting electrode.

15 Claims, 23 Drawing Figures

PATENTED JUN 12 1973 3,738,869

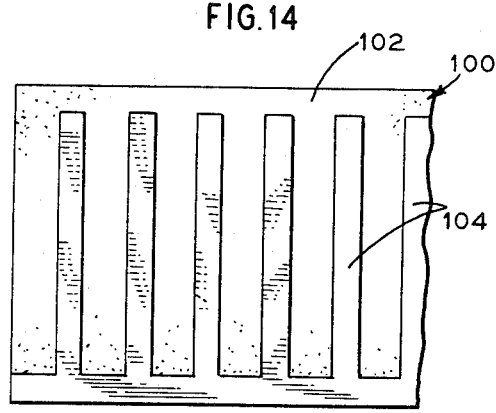
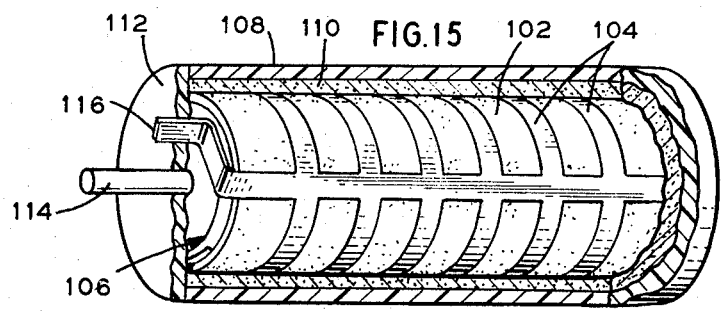

ELECTRIC CELL WITH DEPOLARIZER COMPENSATED AGAINST CURRENT EROSION EFFECTS

This invention relates to electro-chemical energy cells, and particularly to such cells having a construction of improved design in the depolarizer or in the anode.

At present, conventional electro-chemical energy cells are limited in their high-rate primary performance, and in their discharge efficiency, and also in their secondary performance, by problems of depolarizer volume-resistivity, and of surface area variations, and of the ultimate loss of peripheral electrical can contact with the depolarizer material. These problems arise from the erosive effects of the electro-chemical action during operation of the cell.

The object of the present invention is to provide an improved construction of the depolarizer and of the anode, that is relatively simple and economical to assemble and combine in manufacturing operations, and that makes it possible to achieve higher discharge rates and much higher discharge efficiency in operation, and to maintain continuity of electrical conductivity between the depolarizer material and the container can, or other associated electrode, in addition to the economy in manufacture.

The improved construction of this invention, over the conventional hollow cylindrical depolarizer, is achieved by constructing the depolarizer essentially as a vertebral structure, consisting of a stack of annular hollow cylindrical depolarizer pellets with metallic annular contact ring discs disposed between adjacent depolarizer pellets, and connected to the associated metallic support, that may also be serving as a polar terminal. Thus, although the initial form and dimensions of the pellets may be disturbed and distorted, by the erosive effects of the electro-chemical action, electrical conductivity between the disturbed pellets and the associated electrode member is maintained for the life of the cell. Initially, the outer diameter dimensions of the pellets are such as to have a relatively snug slip fit in the metallic can which serves normally as one polar electrode of the cell. The annular metallic discs also have an outer diameter that fits, initially, with a snugly sliding fit into the can. As a result, the entire depolarizer cylinder, including the stack of depolarizer cylindrical pellets with the metallic discs between them, as a manufacturing operation, may be inserted into the can as a hollow cylindrical depolarizer structure.

During manufacture, in this step of inserting the depolarizer cylinder within its supporting can, the electrical conductivity between the depolarizer material and the can is relatively uniform over the entire peripheral surface of the depolarizer cylinder, where, theoretically, the depolarizer material engages its entire peripheral surface with the surface of the can. However, during operation of the cell, the electro-chemical action causes erosion of the depolarizer material in a random manner that can not be controlled, and, consequently, such erosion changes the volumetric dimensions in such manner as to affect and diminish the initial adequate and satisfactory electrical contact of the initial assembly construction. As a result, the current transmission between the depolarizer material and the can is no longer uniform. Further, the current density is consequently no longer uniform, and the resulting concentration of the current at any random location tends to cause acceleration of the non-uniform current conditions with a resultant more rapid deterioration of the cell to a non-usable condition. However, the metallic discs are not chemically deteriorated by such cell action, and serve to maintain electrical contact between the depolarizer material and the can throughout the operating life of the cell.

The primary object of this invention is to provide a cell construction that will prevent usual operative erosion in a depolarizer material from detrimentally affecting the operating conditions and the operating life of the cell.

A further object of the invention therefore is to provide an auxiliary means, such as the metallic discs, or their equivalents, for maintaining a constant uniform current-conducting condition between the depolarizer material and the supporting electrode metal, irrespective of any normally caused eroded condition by current activity within the depolarizer, that would otherwise affect and diminish the desired full conductivity between the depolarizer and the supporting metal.

To achieve that desired object, metallic elements, between the stacked pellets of the depolarizer cylinder, are arranged to serve as permanent conductors of very high conductivity and minimum resistance between the depolarizer material and the supporting electrode metal, such as a rod or a can, so that the depolarizer will serve fully and continuously for the full potential life of the cell, irrespective of the extent or degree of erosion caused in the depolarizer material during effective operation of the cell. Thus, effective operation of the cell need no longer be dependent upon continuous contact between the depolarizer material and its associated electrode.

When the depolarizer is thus used, at the cathode structure, the anode component may be of conventional construction, since it is normally unaffected by the conditions that are effective in causing deterioration of the depolarizer material.

In another modification of a cell, the electric cell may be constructed, in accordance with this invention, to embody the depolarizer cylinder as a member of a coaxial anode-depolarizer pair. Again, the erosion of the depolarizer material is counter-balanced by the continuous electrical conductivity established by the metallic discs between the depolarizer pellets and the associated metal electrode. The construction of two modifications of a cell with the depolarizer elements constructed and arranged in accordance with this invention, are described in the following specification as shown in the accompanying drawings, in which FIG. 1 is a side elevational view, partly in section, of a cell in which the depolarizer structure is shown as a hollow cylindrical structure engaging the inner surface of a container can;

Figure 6:
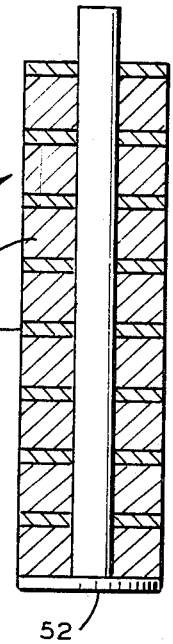
FIG. 6 is a vertical sectional view of another modification of a contact ring and depolarizer consolidation, in which an inner conductor electrode supports a stack of depolarizer pellets coaxially, with the metal disc ring contacts between adjacent depolarizer pellets to provide continuing electrical contact between the pellets and the inner conductor.
Figure 7:
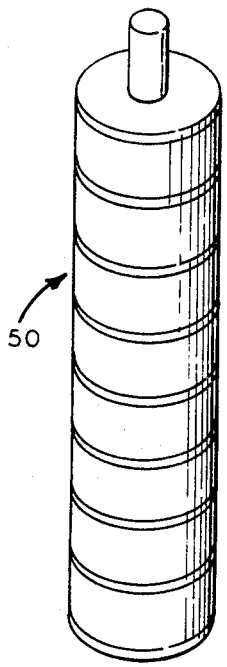
FIG. 7 is a vertical elevational perspective view of the contact and depolarizer assembly of FIG. 6.
Figure 8:
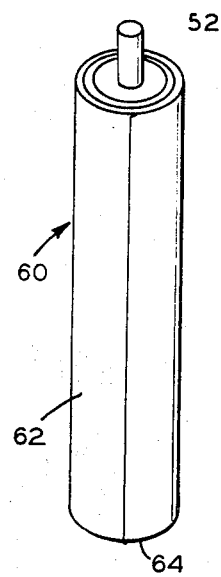
FIG. 8 shows the assembly of FIG. 7 in a subsequent stage of manufacture, in which the consolidation is wrapped in a barrier material for receiving and holding an electrolyte.
Figure 11A:
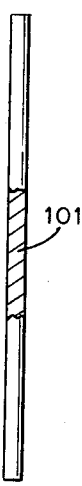
Figure 11B:
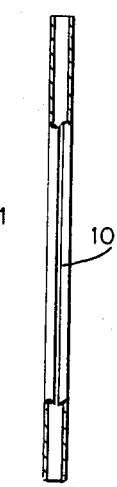
Figure 11C:
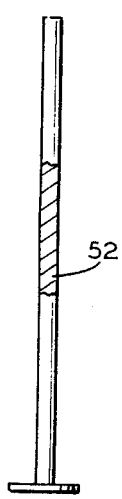
Figure 12A:
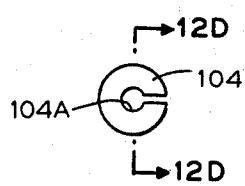
Figure 12D:
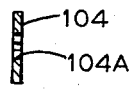
Figure 12B:
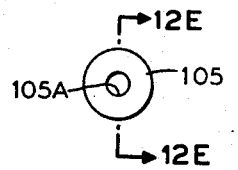
Figure 12E:
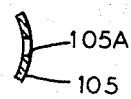
Figure 12C:
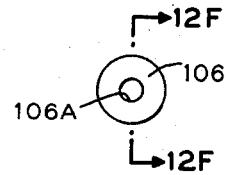
Figure 12F:
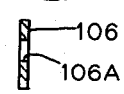
Figure 13A:
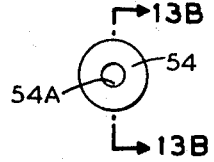
Figure 13B:
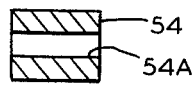

FIG. 11 includes three views A, B and C, showing three different structures that may be used as the supporting conductor for the depolarizer pellets in the modification of FIG. 6;

FIG. 12 includes three views A, B and C, showing three different forms of the metal disc rings in plan, and in edge views D, E and F, which may be used for the modification of FIG. 6;

FIG. 13 shows an end elevational view and a longitudinal sectional view of the depolarizer pellet used for the assembly of FIG. 6;

FIG. 14 shows a different modification of the barrier material as a substrate for supporting a deposited metallic element in granular or electro-plated form to serve as a conductor for the ultimate anode terminal; and FIG. 15 shows a perspective view of the barrier of FIG. 14 when rolled into contact with the depolarizer structure such as in FIG. 7, with the metallic element on the barrier serving to provide a direct connection to the anode terminal of the cell.

As shown in the figures generally, the invention involves a construction of the depolarizer material in a cell, arranged in the form of a vertebral structure consisting of a stack of pellets with a metallic element disposed between each successive two depolarizer pellets and appropriately connected to the associated metallic support that is to serve as a polar element of the cell for ultimate connection to, or to serve as, an electrode of the cell. Thus, the depolarizer pellets which would normally be eroded during the operation of the cell, and would consequently lose electrical contact with the related electrode, will, now, nevertheless be kept in full conducting relationship with the electrode by means of the permanent metal elements between the successive pellets. As a result, the full electro-chemical life of the pellet material is obtainable in the operation of the cell, in spite of the erosion in the pellets themselves, which erosion causes loss of contact between the pellet material and the electrode element, and which erosion has been heretofore a limiting factor in the useful life of the cell.

Figure 1:
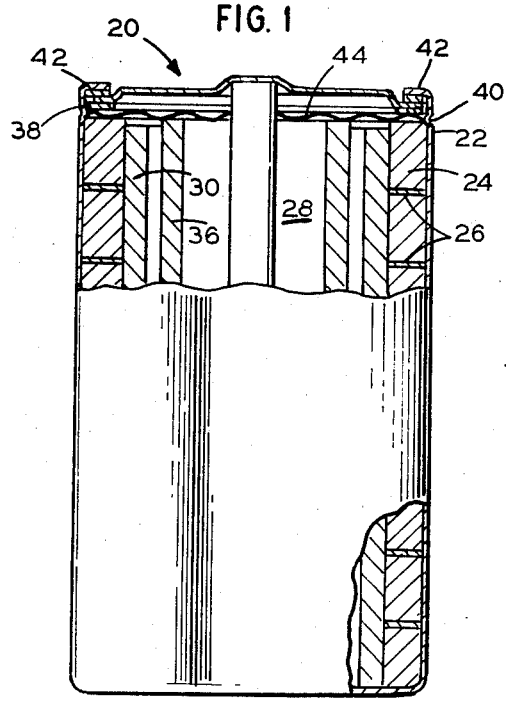

Referring now to FIG. 1, an electric cell 20, embodies a typical conventional container can 22 of metal, such as nickel-plated steel, which is formed essentially as a deep hollow cylindrical cup, to receive, in accordance with this invention, a hollow cylindrical annular body of pellets of depolarizer material 24. Such conventional depolarizer material is formed in annular pellets of appropriate external diameter to fit with a snug fit peripherally and concentrically within the container can.

In previous conventional cells of this type, the erosive effects of the electro-chemical action, during operation, have caused random erosive depletion of the pellets in such manner as to destroy the necessary direct electrical conductive contact between the depolarizer pellets and the metallic container can. The conventional harmful result has been that the useful operating life of the cell has been shortened, and the full electrochemical energy of the cell has not been fully utilized, because of that loss of electrical contact between the depolarizer material and the container can which is one electrode of the cell.

To overcome that disadvantage, the present invention provides an independent permanent conducting connection between the body of each of the depolarizer pellets and the conductor can. To that end, an annular metal contact ring disc 26 is disposed between each pellet and its neighbor in the stack, with the contact ring disc so constructed as to be permanently connected to the electrode throughout the life of the cell. This operative condition is possible since the metal ring discs are not affected by any erosive action such as does affect the depolarizer material. At the same time, the contact ring discs engage the depolarizer pellets over a substantial area, and under pressure, so that, even though the erosion of the pellets may separate them from the container can, and destroy good electrical conductivity, the metallic contact discs remain continuously and permanently in electrical contact with the depolarizer material, and maintain the electrical circuit of the cell effective.

Consequently, the cell is able to maintain its electrochemical activity until all of the electro-chemical energy is extracted from the cathode depolarizer material.

In this construction of the cell, the anode and its associated material may be utilized in any conventional form since the anode is normally unaffected by any erosive action.

In FIG. 1, the anode structure 28 is therefore indicated in generic form, without specifying details, and a barrier 30 is also schematically indicated as an annular cylinder engaging the inner surface of the depolarizer cylinder with a space left between the barrier 30 and the anode structure 28 to accommodate a liquid or slurry or powder mix electrolyte 36. A hermetic seal element 38 is schematically indicated as supporting the anode terminal and is sealed at and around its edge rim, by the can, which is shaped to embody an internal circular peripheral shoulder seat 40 and a peened over flange 42 of the can to hold the hermetic seal tightly in position around its rim and against the seat to seal the cell.

The cell structure may be provided with other features, that may be conventional both as to details of internal structure and details of external structure, but the specific feature to which attention is here directed, is the construction of the depolarizer material to assure permanent electrical conduction relationship to the associated terminal of the cell, which is the container can in this modification.

The construction as shown in FIG. 1 embodies certain functional details that may be designed and provided for maximum efficiency and effective operation.

One important consideration of the assembly is that the thin metal ring-discs should contact the metal can wall to a degree consistent with effecting minimum resistance to the electric current increment which one depolarizer pellet would statistically be expected to conduct.

An additional consideration is that the depolarizer ring-pellet length should preferably be no more than two or three times the pellet wall thickness, if the effective conductivity and efficiency of the total depolarizer consolidation is to be greatly improved.

Certain benefits are obtained from this invention, in the construction as shown in FIG. 1, compared to conventional constructions:

1. the amount of graphite may be significantly reduced relative to that normally used in a manganese dioxide depolarizer consolidation, thereby increasing the amount of $MnO_2$ which could then be substituted. Essentially, more active material could be compressed into the same depolarizer volume.

2. It is fundamental to $MnO_2$ powder consolidations that the principle depolarizer expansion attendant to discharge tends to take place in a direction opposite to the direction of the original compression. Accordingly, the pellet length tends to increase axially with discharge, but being axially restrained by the disclosed construction, the depolarizer material is increasingly compressed against the adjacent contact ring-discs, since expansion of the pellet can only take place orthogonally. This phenomenon improves the "depolarizer to-conductive-disc-contact" relationship with continuing discharge and tends to compensate for the lowering of the depolarizer inherent conductivity with discharge.

It should be noted that the ring-disc contacts for the FIG. 1 assembly are so constructed, being either wavewasher or tinnerman-washer of split washer type, that they never lose electrical contact with the conductive cell can. The disc-to-can constant-contact function is simple to achieve in practice since contact at several points of tangency is sufficient.

3. The vertebral depolarizer design minimizes the requirement for the direct contact of the $MnO_2$ depolarizer pellet to the cell can. Peripheral contact is ordinarily very difficult to achieve and to mmaintain in any case, and this functional design weakness is the basis for a large part of "primary" cell failure, and for a major part of "secondary" cell failure. In the disclosed design, the electrical contact from within the depolarizer consolidation to the cell can is predominantly through the medium of the ringdisc contacts.

Figure 2:
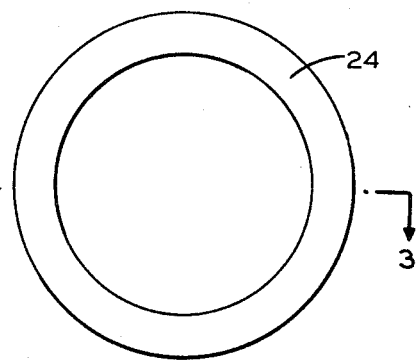
FIG. 2 is a plan view of one of the cylindrical depolarizer pellets.
Figure 3:
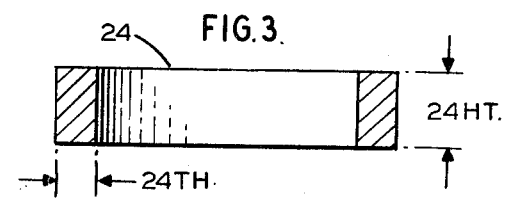
FIG. 3 is a sectional view of the pellet taken on line 3—3 in FIG. 2.

The details of the construction of the elements of the depolarizer structure are shown more fully in FIG. 2 through FIG. 5. As shown in FIG. 2, the unit depolarizer element 24 is a hollow annular ring body having a height, as indicated in FIG. 3, that is about twice the thickness of the ring. That is, dimension 24Ht is about double the dimension 24Th.

Figure 4:
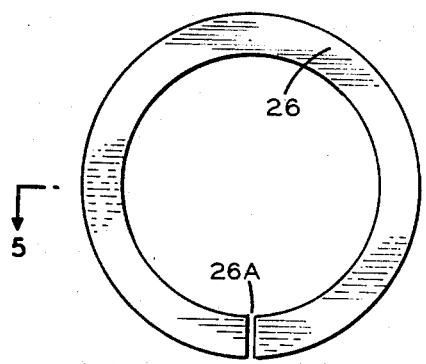
FIG. 4 is a plan view of a metal contact ring disc for disposition between adjacent depolarizer pellets.
Figure 5:
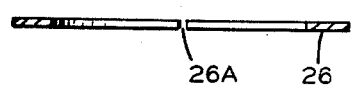
FIG. 5 is an edge view of the annular metal contact ring disc taken on line 5—5 of FIG. 4.

The metal annular ring discs 26, as shown in FIGS. 4 and 5 are of substantially the same external diameter as the depolarizer pellet 24 and are made of relatively thin metal, for example, as of thin shim stock. The ring disc is preferably made with a slot 26A so that it may be assembled in a stack with the depolarizer pellets and be under slight compression radially, in order to establish relatively good electrical contact with the container can, as the ring tends to open up to engage the can. In order to maintain a predetermined initial pressure on the stack of depolarizer pellets, a wave spring 44 is disposed on the top of the depolarizer stack to impress a downward pressure on the stack when the can is sealed by the crimping of the can edge 42 onto the sealing insulation disc 28.

In a second modification of the invention, as shown in FIGS. 6 to 10, an inside-out type of cell is shown in which the electro-chemical elements are disposed and contained in a plastic case form in which the $MnO_2$ depolarizer consolidation is disposed axially innermost, as in FIGS. 6, 7, 8 and 9. As shown in those figures, they depict a depolarizer construction in which a metal axial conductor, solid or hollow, tubular or split tubular, such as a roll pin, constitutes the inner support of which the depolarizer consolidation is assembled.

On this inner support are alternately disposed hollow $MnO_2$ plus graphite pellets and conductive metal washers, as indicated. The final consolidation of the assembly on the rod is accomplished by "locking" washers placed at the rod extremities. When using a "nail" type conductor, the assembly can be placed under axial compression by one separate end-restraining washer or by affixing the cell closures at either end.

The depolarizer sub-assembly 50 of the second modification, as shown in FIGS. 6 and 7, embodies a rod or nail 52 as a support, on which are co-axially threaded, alternately cylindrical pellets 54 and metallic discs 56. The assembly 50 is enclosed in a tubular barrier 60, as in FIG. 8, in which two wraps of 0.007 inch viskon vinyon 62 are shown, and the ends of the tubular barrier 60 are closed off with webril fabric material or other suitable washers 64 to exclude zinc particles from the anode mix which will be disposed around the sub-assembly 50 in the final cell.

The conductivity of the depolarizer pellets 54 to the center rod 52 will usually be minimal, as evidenced by discharged depolarizer pellets which hang "loose" on the rod when the end restraints are removed. To improve and maintain the conductivity of the depolarizer 50 to the rod 52, the conductive washers or discs 56, of 0.002 to 0.005 inch tab stock, are interposed between the pellets, and are designed to always contact the rod 52 along the shank at some point in the peripheral relationship of metal washer I.D. and metal rod O.D. It is not necessary for the depolarizer pellets 54 to contact the rod 52 intimately, since that function is now performed by the discs or washers 56.

In this same connection, it has been determined that if the depolarizer assembly column is restrained at both ends, the axial expansion resulting from discharge, improves the axial pellet-to-washer contact pressure. Conversely, it has been determined that the radial rod-to-depolarizer pellet contact worsens with discharge.

Figure 9:
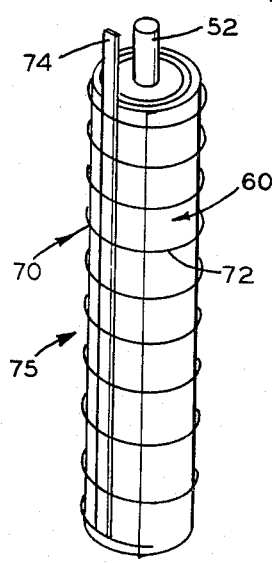
FIG. 9 is a perspective view showing the assembly of FIG. 8 with a spiral anode contact wire wrapped around the assembly and over a metal conductor to serve as the anode of the final cell.
Figure 10:
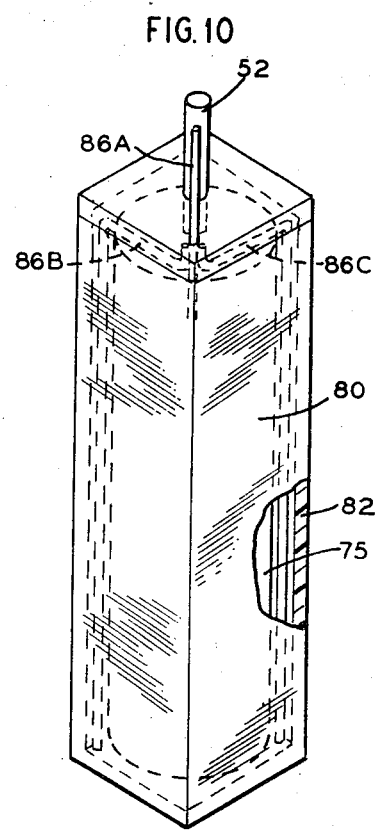
FIG. 10 shows the cell structure in which the assembled depolarizer with the barrier and wrap-around anode of FIG. 9 is inserted as a complete assembly in a plastic cell case as the container.

The anode and contact arrangement 70, shown in FIG. 9, consists of a spiralled copper wire 72, wound on the depolarizer-barrier assembly cylinder 60 and engaging an elongated contact strip 74 disposed along the length of the depolarizer assembly cylinder 60; and the entire structural assembly 75 of cell components is ready for insertion in an appropriate housing 80, as shown in FIG. 10.

The housing 80 in FIG. 10, is of insulating material, of appropriate strength, and is of a form, square or triangular, to provide one or more elongated spaces 82, parallel to the structural assembly 75 for accommodating an anode mix 84 of zinc particles and a fluid electrolyte, for example, such as KOH.

Three anode strips 86A, 86B and 86C are secured to the helical wire wrap, such as 72 in FIG. 9, for stability and ease of insertion of the assembly into the housing 80, and to provide adequate current conductive paths to the outer anode terminal. The anode strips may extend out of the open end of housing 80, initially, as in FIG. 10, and are then joined to one anode terminal for the cell, and a sealing cap is then applied to fit over that anode terminal and the central cathode terminal 52, and is appropriately bonded to the rim edge of the housing to provide a hermetic seal. Similarly, the two terminals 86 and 52 are bonded to the sealing cap.

FIG. 11 shows in three sub figures A, B and C three different types of supporting rods for this second modification for use in the assemblies shown in FIGS. 6 and 7, for example. In FIG. 11, a solid rod 101 may be used upon which to thread the depolarizer pellets 54 and the metal discs 56, of the kind shown in FIG. 6, and two suitable pressure washers may be used at the end of the stack to assure permanent continuing pressure on the depolarizer pellets. Alternatively, a split tube 102 may be used, which will provide an additional advantage of having the tube itself provide some internal radial spring pressure against the depolarizer pellets and the metal discs. An additional alternative is the nail head 52 that is actually shown in FIG. 6.

In FIG. 12 are shown three types of disc washers which may be employed with the assemblies of FIGS. 6 and 7, and with any of the internal supporting elements shown in FIG. 11.

As shown in FIG. 12, three types of washers may be employed as shown in the sub figures A, B and C. Washer disc 104 in FIG. 12A is shown as a split washer disc with its internal diameter 104A made slightly less than that of either of the supporting elements of FIG. 11, so the disc will provide good electrical contact with the supporting rod of FIG. 11. In FIG. 12B, a concave washer disc 105, with opening 105A, is indicated as a type that may be employed, to have an initial axial pressure on the stack of depolarizer pellets when a disc 105 at each end of the stack is pressed home against the stack and is frictionally held on the rod 101 or 102 or 52 of FIG. 11. FIG. 12C shows a planar washer disc 106, with central hole 106A, which may be employed to rest against the ends of the stack of pellets, or in between the pellets, similar to the washer discs 104, 105, so all of them may rest against and pressure the pellets while at the same time conductively engaging the inner supporting elements of FIG. 11.

FIG. 13 shows one of the depolarizer pellets 54 with an internal axial passage 54A that will permit the pellet to be pressed onto the supporting elements of FIG. 11 with a snug fit when initially assembled. In view of the erosion during electro-chemical activity in the cell, the erosion effects will be random and usually will diminish the initial effective contact between the depolarizer pellet and the supporting rod of FIG. 11. The addition of the metal discs 56, as shown in FIGS. 6 and 7, serves to maintain good electrical contact between the depolarizer and the supporting rod irrespective of the erosive effects of the current during operation of the cell, and thus maintain electrical conduction between the depolarizer pellets and the related supporting metal as an electrode, irrespective of the condition of the depolarizer material.

In another form of the second modification of this invention, in the inside-out construction, an equivalent of the wrapping 62 and the helical wire 72, of FIG. 9, is provided in an integrated construction, shown in FIGS. 14 and 15.

As shown in FIG. 14, a wrapping 100, of cellulosic base material 102, suitable for use as an absorbent or barrier in an electro-chemical cell, has deposited on its surface a band-like matrix of electrically conductive material 104 to serve as the conductor for a mating surface of electro-chemically active anode or depolarizer material.

The conductive material may be granular material deposited on areas appropriately covered with bonding or cementing material, or otherwise electrodeposited on prepared areas.

The wrapping 100 as formed in FIG. 14 is then wrapped around a depolarizer sub-assembly such as 50 in FIGS. 6 and 7, to constitute a cylindrical cell assembly 106, as in FIG. 15. The assembly 106 is then disposed in an insulating housing 108, similar to housing 80 in FIG. 10, after which an anode powder mix 110 is disposed in the space around the assembly 106, and a sealing cap 112 is applied to seal the housing 108 and to provide insulating support for the two cell terminals 114 and 116.

As disclosed herein, the compound depolarizer structure, with separate, individual and permanent connections between an electrode and each depolarizer pellet or element, provides many advantages, of which some have been mentioned, and the most beneficial ones being the longer operating life of the cell, the more efficient operation, the more stabilized current and density, and the increase in the percentage of depolarizer material that may be included in the depolarizer structure.

The invention is not limited to the specific arrangements shown, but may be variously modified within the spirit of the invention without departing from the spirit and scope of the claims.

What is claimed is:

1. An electro-chemical energy-cell comprising
    an electrode consisting of a plurality of annular discs of the electrode material, co-axially disposed, as a stack;
    a metal element to serve as a polar terminal for said electrode;
    end means independent of the material discs for establishing electrical connection between the discs and said metal element.

2. An energy cell, as in claim 1, in which
    said conducting means between said material discs serve to connect said material discs electrically in parallel to said polar terminal.

3. An energy cell, as in claim 2, in which
    said conducting means serve to electrically connect said material discs to said polar terminal;
    and means on said terminal serve to physically support said discs in place from said polar terminal.

4. An energy cell, as in claim 1, in which
    said annular discs are disposed co-axially in a stack;
    and means are disposed at the ends of the stack to compress the discs co-axially.

5. An energy cell, as in claim 1, in which
    said electrode discs constitute a depolarizer structure;

and said polar terminal for said depolarizer consists of a metallic can container.

6. An energy cell, as in claim 1, in which
said electrode discs constitute a depolarizer structure;
and said polar terminal for said depolarizer consists of a linear axial rod disposed concentrically within said discs.

7. An energy cell, as in claim 1, in which
said conducting means constitute metallic washer disc rings.

8. An energy cell, as in claim 7, in which
said washer disc rings are split rings.

9. An energy cell, as in claim 7, in which
said metallic washer disc rings electro-conductively engage the associated metal element that is to serve as a polar terminal; and
means are associated with said polar terminal to keep the material disc rings under compression.

10. An energy cell, as in claim 1, in which
said connection-establishing means constitute conducting means disposed between said material discs and serving to electrically connect said discs to said polar terminal.

11. An energy cell, as in claim 1, in which
said electrode of co-axially stacked discs, said polar terminal, and said electrical connecting means between said discs, are physically assembled as a unitary structure;
a wrap-around separator encircling said unitary structure;
metallic conducting means disposed externally of said separator to serve as an electrode of opposite polarity relative to said first-mentioned electrode;
and a housing enclosing all said components.

12. An energy cell, as in claim 1, in which
said housing is non-conforming in cross-section to said unitary structure, and contains longitudinal spaces between said housing and said unitary structure for receiving and accommodating material to constitute a selected polar terminal.

13. An energy cell, as in claim 1, in which
an electrode consists of a cellulosic material usable as an absorbent or barrier, and having deposited on its surface a band-like matrix of electrically conductive material to serve as the conductor for a mating surface of an electrochemically active anode.

14. An energy cell, as in claim 1, in which
an electrode consists of a cellulosic material usable as an absorbent or barrier, and having deposited on its surface a band-like matrix of electrically conductive material to serve as the conductor for a mating surface of an electrochemically active depolarizer material.

15. An energy cell, as in claim 1, in which
said discs of electrode material erode and tend to lose effective current-conductive engagement with said metal element during operation of said cell,
and said independent electrical connecting means maintain effective current-conductive engagement during operation of said cell.

* * * * *